3,013,028
ESTERS OF OPTIONALLY 17-ALKYLATED ANDROSTA-4,6-DIENE 3β,17β-DIOLS AND INTERMEDIATES THERETO
John S. Baran, Morton Grove, Ill., assignor to G. D. Searle & Co., Chicago, Ill., a corporation of Delaware
No Drawing. Filed Dec. 1, 1960, Ser. No. 72,854
12 Claims. (Cl. 260—397.5)

The present invention is concerned with steroidal dienediol esters and especially with novel esters of androsta-4,6-diene-3,17-diol and 17-alkylandrosta-4,6-diene-3,17-diols, which can be represented by the structural formula

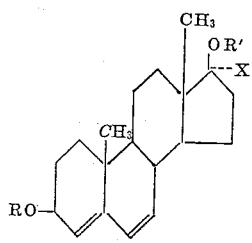

wherein R and R' are selected from the group consisting of hydrogen, lower alkanoyl, and 2-carboxypropionyl radicals in such manner that at least one ester function is always present; and X is selected from the group consisting of hydrogen and lower alkyl radicals. An additional feature of this invention comprises novel intermediates in the manufacture of the instant esters.

The lower alkanoyl radicals which R and R' can represent are, typically, formyl, acetyl, propionyl, butyryl, valeryl, caproyl, and also the branched-chain isomers thereof, said groups being the acyl radicals of alkanoic acids containing fewer than 7 carbon atoms.

Examples of the lower alkyl radicals encompassed by the X term are methyl, ethyl, propyl, butyl, pentyl, hexyl, and their branched-chain isomers.

Suitable starting materials for the manufacture of the instant 17α-alkyl-3β,17β-diol esters are the corresponding diols represented by the structural formula

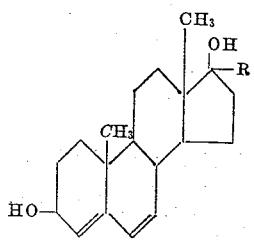

where R is a lower alkyl radical. These diols are conveniently prepared by treatment of the corresponding 17α-alkyl-17β-hydroxyandrosta-4,6-dien-3-ones with a suitable reducing agent in an inert solvent. For example, 17β-hydroxy-17α-methylandrosta-4,6-dien-3-one in tetrahydrofuran is reduced by means of lithium tertiary-butoxy aluminum hydride to afford 17α-methylandrosta-4,6-diene-3β,17β-diol. These novel intermediates are useful also as androgenic agents, which are further characterized by lack of potent anabolic side effects. Acylation of these diols, for example with a lower alkanoic acid anhydride or with succinic anhydride in pyridine at room temperature, affords the corresponding 3-monoesters. Under similar conditions but at elevated temperatures, the 3,17-diesters result. Specific examples are the manufacture of 3β-acetoxy-17α-methylandrosta-4,6-dien-17β-ol and 17α-methylandrosta-4,6-diene-3β,17β-diol 3,17-diacetate by reaction with acetic anhydride and pyridine at room temperature and at about 120°, respectively.

The instant esters of androsta-4,6-diene-3β,17β-diol can be manufactured from the corresponding 17-esters of 17β-hydroxyandrosta-4,6-dien-3-one. Reduction of these keto compounds, for example by the process described supra, affords the instant 17β-(lower alkanoyl)oxyandrosta-4,6-dien-3β-ols. A specific illustration of this method is the reaction of 17β-acetoxyandrosta-4,6-dien-3-one in tetrahydrofuran with lithium tertiary-butoxy aluminum hydride to yield 17β-acetoxyandrosta-4,6-dien-3β-ol. The latter 17β-(lower alkanoyl)oxyandrosta-4,6-dien-3β-ols upon treatment with a lower alkanoic acid anhydride in pyridine afford the corresponding 3β,17β-diesters. The aforementioned 17β-acetoxyandrosta-4,6-dien-3β-ol, for example, yields androsta-4,6-diene-3β-17-diol 3,17-diacetate upon treatment with acetic anhydride and pyridine.

The esters of this invention are useful as result of their valuable pharmacological properties. They are, for example, androgenic agents which lack the potent anabolic side-effect typical of related prior art compositions.

This invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples temperatures are given in degrees centigrade (° C.). Quantities of materials are expressed in parts by weight unless otherwise noted.

*Example 1*

To a solution of 2 parts of 17β-hydroxy-17α-methylandrosta-4,6-dien-3-one in 66.6 parts of tetrahydrofuran is added 4 parts of lithium tertiary-butoxy aluminum hydride, and the reaction mixture is stirred at room temperature for about one hour. To this mixture is added carefully moist tetrahydrofuran and chloroform, and the resulting mixture is washed with water, dried over anhydrous sodium sulfate, and evaporated to dryness. The residue is triturated with ether, and the resulting crystalline product is recrystallized from acetone to yield pure 17α-methylandrosta-4,6-diene-3β,17β-diol, M.P. about 235°; $[\alpha]_D = -98°$ (methanol). It displays infrared maxima at about 2.88, 3.38, 6.07, 6.20, 7.05, and 9.78 microns and also ultraviolet maxima at about 232, 239, and 247.5 millimicrons with molecular extinction coefficients of about 20,400, 23,200, and 15,000, respectively.

*Example 2*

To a solution of 5 parts of 17β-acetoxyandrosta-4,6-dien-3-one in 666 parts of tetrahydrofuran is added 10 parts of lithium tertiary-butoxy aluminum hydride and the resulting mixture is stirred for about 45 minutes at room temperature. Moist tetrahydrofuran and chloroform are added successively and this organic mixture is washed with water, dried over anhydrous sodium sulfate, and concentrated to dryness. The resulting crystalline residue is triturated with ether, then recrystallized from acetone-hexane to afford pure 17β-acetoxyandrosta-4,6-dien-3β-ol, M.P. about 147–148°; [α]_D = −55° (chloroform). It displays infrared maxima at about 2.79, 3.38, 5.72, 8.92, and 9.40 microns and also ultraviolet maxima at about 232, 239, and 247.5 millimicrons with molecular extinction coefficients of about 21,400, 24,000, and 15,700, respectively.

*Example 3*

A mixture of one part of 17β-acetoxyandrosta-4,6-dien-3β-ol, 2 parts of acetic anhydride and 10 parts of pyridine is heated on the steam bath for about one hour. The reaction mixture is cooled, diluted with water, and the resulting crystalline precipitate is collected by filtration and dried. Crystallization from ether-hexane affords pure androsta-4,6-diene-3β,17β-diol 3,17-diacetate, M.P. about 169–170°; [α]_D = −83° (chloroform). This substance displays infrared maxima at about 3.46, 5.73, 7.97, 9.70, and 11.56 microns, and also ultraviolet maxima at about 231.5, 238, and 246.5 millimicrons with extinction coefficients of about 25,000, 27,400, and 17,500, respectively.

*Example 4*

A mixture of one part of 17α-methylandrosta-4,6-diene-3β,17β-diol, 2 parts of acetic anhydride, and 10 parts of pyridine is stored at room temperature for about 16 hours, then poured slowly into water. The resulting crystalline precipitate is separated by filtration, dried, and recrystallized from acetone-hexane to afford pure 3β-acetoxy-17α-methylandrosta-4,6-dien-17β-ol, M.P. about 139–140°. This substance is characterized by maxima in its infrared absorption spectrum at about 2.90, 3.40, 5.80, 6.09, 6.20, 7.26, 8.05, and 10.31 microns.

*Example 5*

A mixture of one part of 17α-methylandrosta-4,6-diene-3β,17β-diol, 2 parts of propionic anhydride, and 10 parts of pyridine is allowed to stand at room temperature for about 15 hours, then poured slowly into water. The resulting crude product is separated by filtration, dried, and recrystallized from ether-pentane to afford 17α-methyl-3β-propionoxyandrosta-4,6-dien-17β-ol, M.P. about 99–100°. It displays infrared maxima at about 2.87, 3.40, 5.75, 8.42, 10.40, and 11.71 microns.

*Example 6*

A mixture of 3 parts of 17α-methylandrosta-4,6-diene-3β,17β-diol, 1.5 parts of succinic anhydride, and 20 parts of pyridine is stored at room temperature for about 24 hours, then diluted carefully with water. The precipitated product is collected by filtration, dried, and dissolved in chloroform. The chloroform solution is washed successively with dilute hydrochloric acid and water, dried over anhydrous sodium sulfate, and evaporated to dryness in vacuo to afford a residue, which is triturated with ether to yield a crude crystalline product. Recrystallization from acetone affords pure 3β-(2-carboxypropionyl)-17α-methylandrosta-4,6-dien-17β-ol, M.P. about 165–166°; [α]_D = −84.5° (chloroform). This compound is further characterized by infrared absorption maxima at about 2.84, 3.40, 5.71, 5.80, 8.50, 9.20, and 11.55 microns.

*Example 7*

The substitution of an equivalent quantity of 17α-ethylandrosta-4,6-dien-3-one in the process of Example 1 results in 17α-ethylandrosta-4,6-diene-3β,17β-diol.

*Example 8*

By substituting an equivalent quantity of 17α-ethylandrosta-4,6-diene-3β,17β-diol and otherwise proceeding according to the process described in Example 4, 3β-acetoxy-17α-ethylandrosta-4,6-dien-17β-ol is obtained.

*Example 9*

When an equivalent quantity of 17β-propionoxy-androsta-4,6-dien-3-one is substituted in the process of Example 2, 17β-propionoxyandrosta-4,6-dien-3β-ol is obtained.

*Example 10*

Androsta-4,6-diene-3β,17β-diol 3,17-dipropionate is produced by the reaction of 2 parts of 17β-propionoxyandrosta-4,6-dien-3β-ol and 5 parts of propionic anhydride according to the procedure of Example 3.

*Example 11*

A mixture of one part of 17α-methylandrosta-4,6-diene-3β,17β-diol, 2 parts of acetic anhydride, and 5 parts of pyridine is heated at the reflux temperature for about 30 minutes, then cooled and diluted with ice and water. Extraction of this aqueous mixture with ether affords an organic solution, which is washed successively with dilute hydrochloric acid, water, and aqueous sodium bicarbonate, dried over anhydrous sodium sulfate, and evaporated to dryness to yield 17α-methylandrosta-4,6-diene-3β,17β-diol 3,17-diacetate as an oil. This substance displays infrared maxima at about 3.42, 3.71, and 7.90 microns, and ultraviolet maxima at about 231, 238, and 247 millimicrons with molecular extinction coefficients of about 25,000, 27,000, and 17,500, respectively.

What is claimed is:

1. A compound of the structural formula

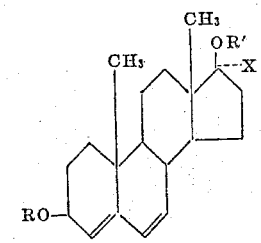

wherein R and R′ are selected from the group consisting of hydrogen, lower alkanoyl, and 2-carboxypropionyl radicals, with the provision that at least one ester group is always present, and X is selected from the group consisting of hydrogen and lower alkyl radicals.

2. A compound of the structural formula

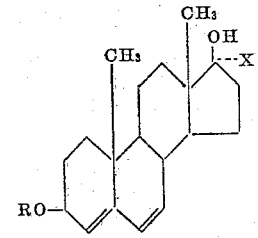

wherein R is a lower alkanoyl radical and X is a lower alkyl radical.

3. A compound of the structural formula

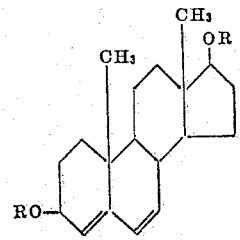

wherein R is a lower alkanoyl radical.

4. A compound of the structural formula

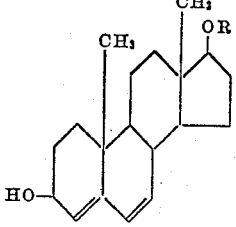

wherein R is a lower alkanoyl radical.

5. 3β-acetoxy-17α-methylandrosta - 4,6 - dien-17β-ol.
6. 17α-methyl-3β-propionoxyandrosta - 4,6 - dien-17β-ol.
7. 3β-(2-carboxypropionyl) - 17α - methylandrosta-4,6-dien-17β-ol.
8. 17β-acetoxyandrosta-4,6-dien-3β-ol.
9. Androsta-4,6-diene - 3β,17β - diol 3,17-diacetate.
10. 17α-methylandrosta - 4,6 - diene-3β,17β-diol 3,17-diacetate.
11. A compound of the structural formula

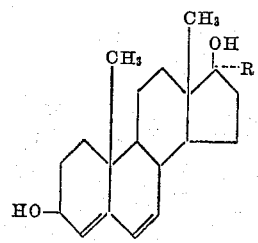

wherein R is a lower alkyl radical.

12. 17α-methylandrosta - 4,6 - diene-3β,17β-diol.

No references cited.